(12) United States Patent
Handy et al.

(10) Patent No.: US 8,880,459 B2
(45) Date of Patent: Nov. 4, 2014

(54) NAVIGATION ACROSS DATASETS FROM MULTIPLE DATA SOURCES BASED ON A COMMON REFERENCE DIMENSION

(75) Inventors: Stephen Handy, Redmond, WA (US); Brent Wilson, Issaquah, WA (US); Ramesh Arimilli, Bellevue, WA (US); Corey Hulen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 966 days.

(21) Appl. No.: 12/044,033

(22) Filed: Mar. 7, 2008

(65) Prior Publication Data

US 2009/0228485 A1    Sep. 10, 2009

(51) Int. Cl.
*G06F 17/30* (2006.01)

(52) U.S. Cl.
CPC .... *G06F 17/30592* (2013.01); *G06F 17/30557* (2013.01); *Y10S 715/963* (2013.01)
USPC .......................................... 707/603; 715/963

(58) Field of Classification Search
CPC ................... G06F 17/30557; G06F 17/30592; G06F 17/30572; G06F 17/30312; G06F 17/30333
USPC .......................................... 707/603; 715/963
See application file for complete search history.

(56) References Cited

U.S. PATENT DOCUMENTS

| | | | |
|---|---|---|---|
| 6,397,195 B1 * | 5/2002 | Pinard et al. ..................... | 705/30 |
| 6,493,708 B1 * | 12/2002 | Ziauddin et al. .................. | 1/1 |
| 7,171,427 B2 * | 1/2007 | Witkowski et al. ................. | 1/1 |
| 7,627,620 B2 * | 12/2009 | Campos et al. ...................... | 1/1 |
| 7,716,167 B2 * | 5/2010 | Colossi et al. ...................... | 1/1 |
| 2003/0110249 A1 | 6/2003 | Buus et al. | |
| 2004/0225955 A1 | 11/2004 | Ly | |
| 2005/0010550 A1 * | 1/2005 | Potter et al. ....................... | 707/1 |
| 2005/0027574 A1 | 2/2005 | Agrawal et al. | |
| 2005/0060300 A1 * | 3/2005 | Stolte et al. ...................... | 707/3 |
| 2006/0036455 A1 | 2/2006 | Prasad et al. | |
| 2006/0089939 A1 | 4/2006 | Broda et al. | |
| 2006/0253475 A1 * | 11/2006 | Stewart et al. ................ | 707/100 |
| 2007/0027904 A1 * | 2/2007 | Chow et al. ................... | 707/102 |
| 2007/0106753 A1 | 5/2007 | Moore | |
| 2007/0130113 A1 | 6/2007 | Ting | |
| 2007/0255681 A1 | 11/2007 | Tien et al. | |
| 2008/0196108 A1 * | 8/2008 | Dent et al. ...................... | 726/28 |

FOREIGN PATENT DOCUMENTS

| | | |
|---|---|---|
| AU | WO2007065195 A1 | 6/2007 |
| WO | WO2007015990 A2 | 2/2007 |

OTHER PUBLICATIONS

"How do I use multiple data sources in a single time intelligence filter?", 2007, Microsoft Corporation.
Payne, "Business intelligence and data warehousing in SQL server 2005", Jul. 15, 2004, Microsoft Corporation.

(Continued)

*Primary Examiner* — Jorge A Casanova
(74) *Attorney, Agent, or Firm* — Thomas Wong; David Andrews; Micky Minhas

(57) ABSTRACT

Architecture for slicing data defined on both tabular data sources and in OLAP (online analytical processing) multidimensional data sources by time relative to the current date simultaneously with the same time intelligence (TI) filter on a dashboard page. The architecture employs a simple time period specification (STPS) language used to specify time periods in monitoring server TI filters, and key performance indicator (KPI) filters. The architecture maps all time dimensions to a common set of time aggregations (hierarchy) and to a common calendar.

17 Claims, 13 Drawing Sheets

(56) References Cited

OTHER PUBLICATIONS

"Re: Automatic date filters", 2007, Microsoft Corporation.

Eckerson, "Next-Generation Business Intelligence", 1998-2007, 1105 Media, Inc.

* cited by examiner

600

| Editor | Properties | Time |

⊕ AS-1

Reference Data Mapping

Time Dimension:
Due.Date.Calendar

Reference Member: ← 602
Member:
January 1, 2002     Browse...

Hierarchy level:
Hour

Reference Date: ← 604
Enter a date that is equal to the period specified by the reference member above:
1/1/2002

MAPS TO...

Time Member Associations

| Member Level ← 606 | Time Aggregation ← 608 |
|---|---|
| Calendar Year | Year |
| Calendar Semester | None |
| Calendar Quarter | Quarter |
| Month | Month |
| Date | Day |
| | Semester |
| | Quarter |
| | Month |
| | Week |
| | Day |
| | Hour |
| | Minute |
| | Second |

Home > Documents > Time Scenarios > Page 2

Time Scenarios : Page 1 | Page 2

Date: September 10, 2006

*1300*

*1306* Calendar popup - September 06, with dates; 10 and 14 highlighted; "Today"

*1302* Filter Mode table:

|  | September 2003 | | August 2003 | | July 2003 | |
|---|---|---|---|---|---|---|
|  | Target | Actual | Target | Actual | Target | Actual | Target |
| Internet | $1,010,258.13 | | $847,413.51 | $847,413.51 | $886,668.84 | $886,668.84 |
| Internet Order Quantity | 3,885 | | 3,819 | 3,819 | 1,411 | 1,411 |
| Internet Extended Amount | $1,010,258.13 | | $847,413.51 | $847,413.51 | $886,668.84 | $886,668.84 |
| Internet Tax Amount | $80,820.65 | | $67,793.08 | | $70,933.51 | |
| Internet Freight Cost | $25,256.63 | | $21,185.51 | | $22,166.78 | |

AdventureWorks Status

*1304* Filter Mode

|  | CY 2003 | | Q3 CY 2003 | | September 2003 | | September 10, 2003 | |
|---|---|---|---|---|---|---|---|---|
|  | Actual | Target | Actual | Target | Actual | Target | Actual | Target |
| Internet Sales Amount | $9,791,060.30 | $9,791,060.30 | $2,744,340.48 | $2,744,340.48 | $1,010,258.13 | $1,010,258.13 | $31,852.73 | $31,852.73 |
| Internet Order Quantity | 24,443 | 24,443 | 9,115 | 9,115 | 3,885 | 3,885 | 121 | 121 |
| Internet Extended Amount | $9,791,060.30 | $9,791,060.30 | $2,744,340.48 | $2,744,340.48 | $1,010,258.13 | $1,010,258.13 | $31,852.73 | $31,852.73 |

*FIG. 13*

NAVIGATION ACROSS DATASETS FROM MULTIPLE DATA SOURCES BASED ON A COMMON REFERENCE DIMENSION

BACKGROUND

Disparate data sources and data types can introduce significant problems to corporate employees tasked with consolidating information into cognizable reports, when attempting to ascertain the health of the corporation, for example. Moreover, the costs and resources required for determining and monitoring the "wellness" (or lack thereof) of the company can be significant. For example, metrics involved with the generation of key performance indicators (KPIs) provide a means for assembling a scorecard to assist a company in defining and measuring corporate wellness by assessing progress toward organizational as well as corporate goals.

In one complex business analysis example, the business user needs to report on the health of a company by compiling and analyzing information over four different corporate business groups (e.g., finances, customers, staffing, and employee satisfaction). This information can be stored in different types of data sources such as multidimensional and/or tabular lists. Scorecards and dashboards provide a mechanism for tapping into this data in order to provide a high-level view of various interesting aspects of the corporate health. Dashboards may contain several reports or scorecards. The data sources on which each report is based may be different for each report or scorecard. Consumers of these dashboards want to view current data, regardless of the origin of the report's underlying data. Consumers also want the ability to navigate time, for example, in reports using simple filter controls such as a calendar or select list. Designers of the dashboard want the ability to align time dimensions between multiple cubes and perspectives and to define time dimensionality for tabular (table or view) data. Accordingly, as a means to reduce costs and resources for accessing and analyzing corporate well-being, businesses desire ways in which to provide business users a quick and easy mechanism for working with complex business processes.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides ability to slice data defined on both tabular data sources and in OLAP (online analytical processing) multidimensional data sources by time relative to the current date simultaneously with the same time intelligence (TI) filter on a dashboard page. The architecture employs a simple time period specification (STPS) language used to specify time periods in monitoring server TI filters, and key performance indicator (KPI) filters. STPS is a simple, intuitive means of declaring time periods based on relative position from the current date. The architecture maps all time dimensions to a common set of time aggregations (hierarchy) and to a common calendar.

In the case of multidimensional data, the architecture allows existing time dimensions to be identified and mapped to a common time reference (e.g., a Gregorian calendar) and time hierarchy. This is accomplished by mapping a single time member to a known reference date. This reference point in the time hierarchy can then be used to determine the member representing the current time period. Once this is determined, offsets from current can be calculated for the time dimension. In the case of tabular data (data derived from a table or view), the architecture allows the user to define time dimensionality on date-time columns present in the tabular data.

Once the time dimensionality for each data source are mapped to a common calendar, or created, in the case of tabular data, there is sufficient information to slice the reports simultaneously based on these data sources using the same TI filter. One or more TI-enabled data sources can be selected to use for the TI filter. When creating and configuring a TI filter, interaction via the STPS language allows the specification of offsets from the current date, time periods, parallel periods, and sets or ranges of time periods. Complex sets of relative time periods can be created using this feature to represent a wide range of common business scenarios.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

BRIEF DESCRIPTION OF THE DRAWINGS

FIG. 6 illustrates an exemplary dimension mapping UI.

FIG. 7 illustrates a data definition view for tabular data.

FIG. 13 illustrates a UI that shows a time slice for two scorecards.

DETAILED DESCRIPTION

Figure 1:
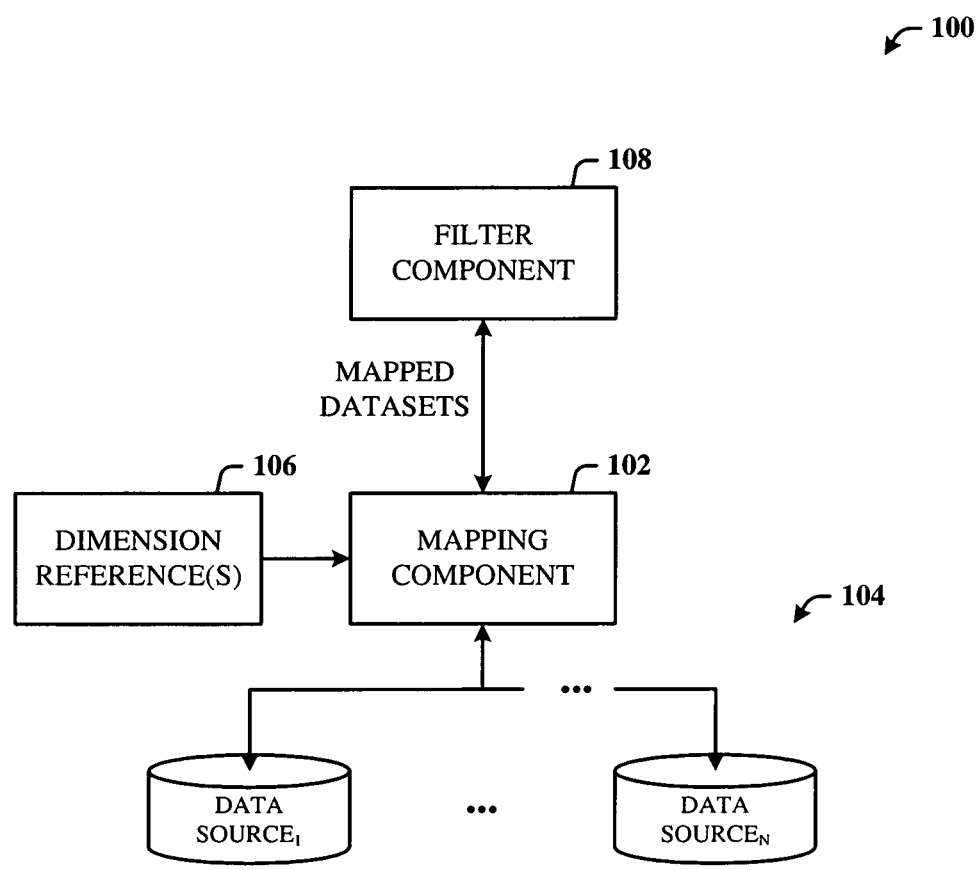
FIG. 1 illustrates a computer-implemented system for processing data for a dashboard.

The disclosed architecture is a common method for managing time across data from disparate data sources. The enables persona to provide target consumers with meaningful content that is timely and current, that is representative of appropriate scope, and that is presented within relevant historical context. The architecture facilitates a consistent and intuitive user experience for integrating time intelligence (TI) into scorecards, analytic views, and reports. The ease-of-use is achieved by reducing complexity associated with TI while maintaining sufficient feature robustness to meet core usage scenarios. The architecture provides an integration methodology and design pattern that can be used by other software manufacturer organizations by creating a feature set that is an asset to the organization as a whole. It is a framework for managing time in future versions of the product. The architecture provides consistency with other views. Similar usage patterns can be implemented throughout the various user interaction surfaces, and existing interfaces and functionality re-used where appropriate and that new functionality is ensured for use consistently throughout applications.

Generally, the architecture allows the user to bring data in from multiple different data sources that may have different time stamps, and to align the data with a common reference. The user can then view portions of the data based on any time period implemented.

In a first aspect, data sources are formatted to be suitable for TI. In the context of OLAP (online analytical processing) data like multidimensional data, typically, the time periods in that kind of structure are already well-formed but not always easy to identify. In the case of OLAP data, a reference date is selected and that reference date is aligned with the corresponding new member in the time hierarchy that is in the OLAP source. This allows for computing the absolute position of the present date. With respect to tabular data sources, a multidimensional structure is constructed from the tabular data as well as the time aggregations to be constructed. Once time aggregations are known for tabular data, and in the OLAP phase, the aggregations can be compared. Thus, TI operates across all the data sources.

A second aspect is the ability to drive what the current date is for all the different data sources. Once the current date known, sliding windows of time can be implemented that change as the date moves forward. That is the standard time intelligence behavior.

A third aspect is a simple time period specification (STPS) language that employs a syntax which can be applied uniformly to all the different data services. For example, an operation such as year-1 relative to the current date will give the same slice of time for the parallel period of last year.

Summarizing, the STPS language allows for synchronize multiple reports on a single dashboard using the TI. For example, the dashboard can include reports from different data sources such as a scorecard, a report from a reporting service, data from a spreadsheet application, and an analogue chart. TI filters can be created for sliding windows of time uniformly across the data, changing scenarios, changing calendar date, and so on.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented system 100 for processing data for a dashboard. The system 100 includes a mapping component 102 for mapping dimensions of datasets from data sources 104 to a common dimension reference 106 to obtain mapped datasets, and a filter component 108 for filtering the mapped datasets simultaneously based in part on offsets to the common dimension reference 106. The datasets are at least one of reports or scorecards presented as part of a dashboard. The dimensions of the datasets have a characteristic of atomically increasing entailment. The data sources include tabular data and OLAP data.

Figure 2:
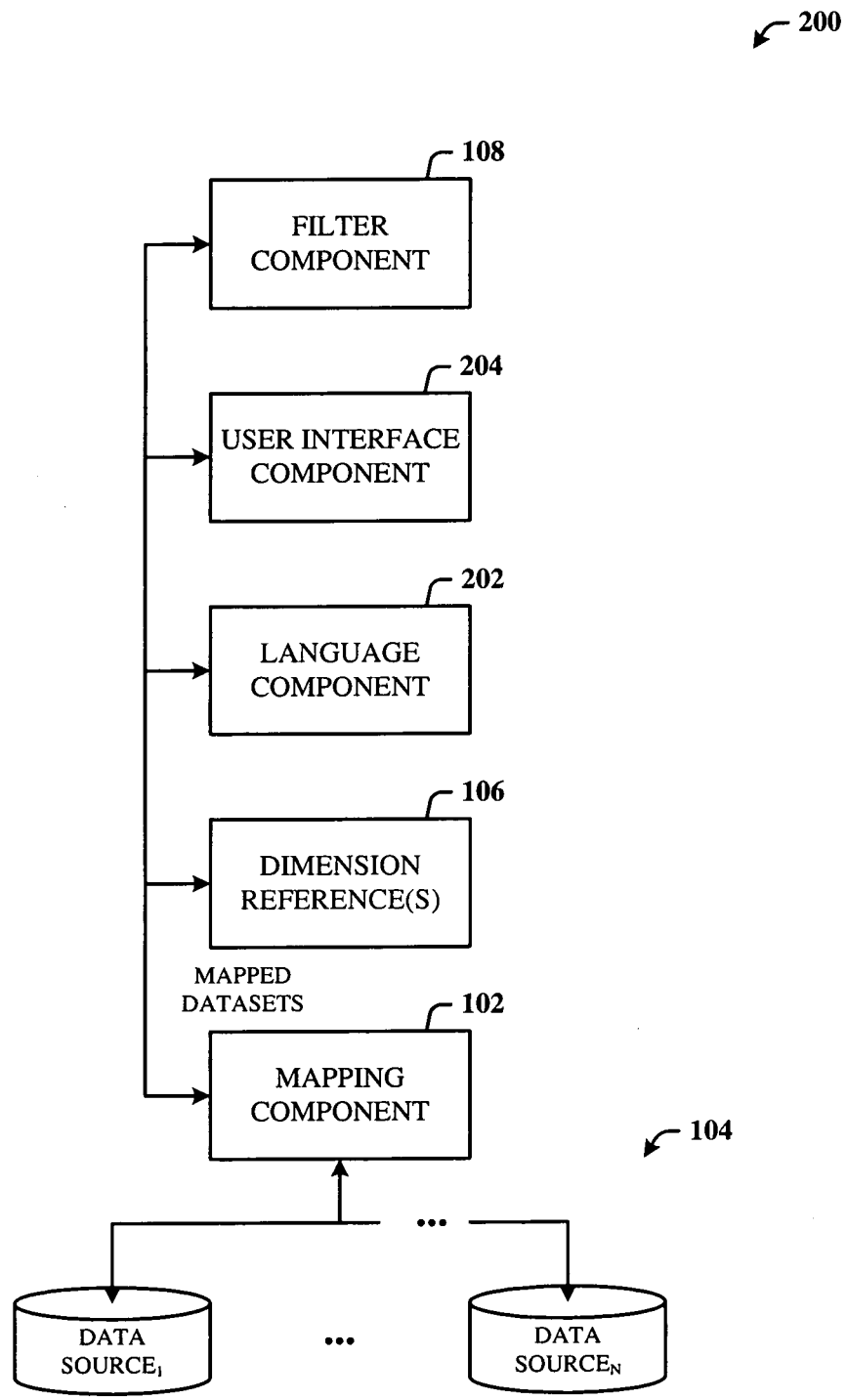
FIG. 2 illustrates a more specific implementation of a system where the dimension is time.

FIG. 2 illustrates a more specific implementation of a system 200 where the dimension is time. The system 200 includes the components of FIG. 1, for example, the mapping component 102 for mapping, in this example, time dimensions of datasets from the data sources 104 to a common time reference to obtain mapped datasets, and the filter component 108 for filtering the mapped datasets simultaneously based on a time period.

Additionally, the system 200 includes a language component 202 for specifying a time period relative to the common time reference over which to filter the mapped datasets. The mapped datasets are at least one of reports or scorecards processed as part of a dashboard. The datasets obtained from data sources 104 include both tabular data and multidimensional data. The mapping component 102 maps existing time dimensions of the multidimensional data to a common calendar and time aggregation. The language component 202 facilitates specifying time dimensionality of a date-time column in the tabular data. The filter component 108 employs time intelligence for filtering the mapped datasets over the time period relative to a current date based on a calendar as the common time reference. The filter component 108 filters the mapped datasets based on at least one of the data sources. The language component 202 facilitates specifying of an offset from a current date, time periods, parallel periods, and/or sets or ranges of time periods.

In the context of time dimensions, the language component 202 employs the STPS language. The STPS is a bare-bones syntax used in TI to specify offsets, for example, from a named date or from current. TI selections can be stored using this syntax. Following is one example of the STPS language description.

```
<Formula> ::= <SetExpression> ',' <Formula>
           | <SetExpression>
<SetExpression> ::= <MemberExpression> ',' <SetExpression>
                 | <MemberExpression> ':'
                   <MemberExpression>
<MemberExpression> ::= <Member>
                    | <MemberExpression> '+' Integer
                    | <MemberExpression> '-' Integer
                    | <MemberExpression> '.'
                      <MemberFunction>
<MemberFunction> ::= 'Parent'
                  | 'FirstChild'
                  | 'LastChild'
                  | 'Children'
                  | 'FirstSemester'
                  | 'LastSemester'
                  | 'FirstQuarter'
                  | 'LastQuarter'
                  | 'FirstMonth'
                  | 'LastMonth'
                  | 'FirstWeek'
                  | 'LastWeek'
                  | 'FirstDay'
                  | 'LastDay'
                  | 'FirstHour'
                  | 'LastHour'
                  | 'FirstMinute'
                  | 'LastMinute'
                  | 'FirstSecond'
                  | 'LastSecond'
<Member> ::= 'Year'
          | 'Trimester'
          | 'Semester'
```

-continued

```
    | 'Quarter'
    | 'Month'
    | 'Week'
    | 'Day'
    | 'Hour'
    | 'Second'
Integer = {Digit}+
```

| Syntax: | Usage: |
|---|---|
| Month−1,Year−1,Week+2 | Specifies one or more periods as an offset from current. Periods are delimited by commas. Negative values refer to periods in the past, positive values to periods in the future. |
| Month,Month−0,Year+0,Day0 | Specifies current time period |
| Month:Month−5,Day−0:Day−10 | A colon is used to specify are continuous set of time periods. For example, Month−1:Month−5 would result in a set of 5 periods (Month−1; Month-2; Month-3; Month−4; Month−5). The period specified on the left of the colon is the origin or starting period. The period specified on right of the colon is the ending period. This order is reflected when TI periods are added to a scorecard or parameter. |
| Year.FirstMonth:Month | Specifies year or month to date scenarios. StartMonth, StartWeekNumber. This enables year to date time periods to be specified. |
| (Year−1).Day | Parallel period. Returns the same period the previous year. |
| Year.Firstchild | Returns first child of specified time period. |
| Day.Parent | Returns the parent level of time aggregation from the data source. |

The system 200 also includes a user interface (UI) component 204 via which the user can enter STPS syntax for the time dimension scenarios. Examples of a UI component 204 are provided infra.

Figure 3:
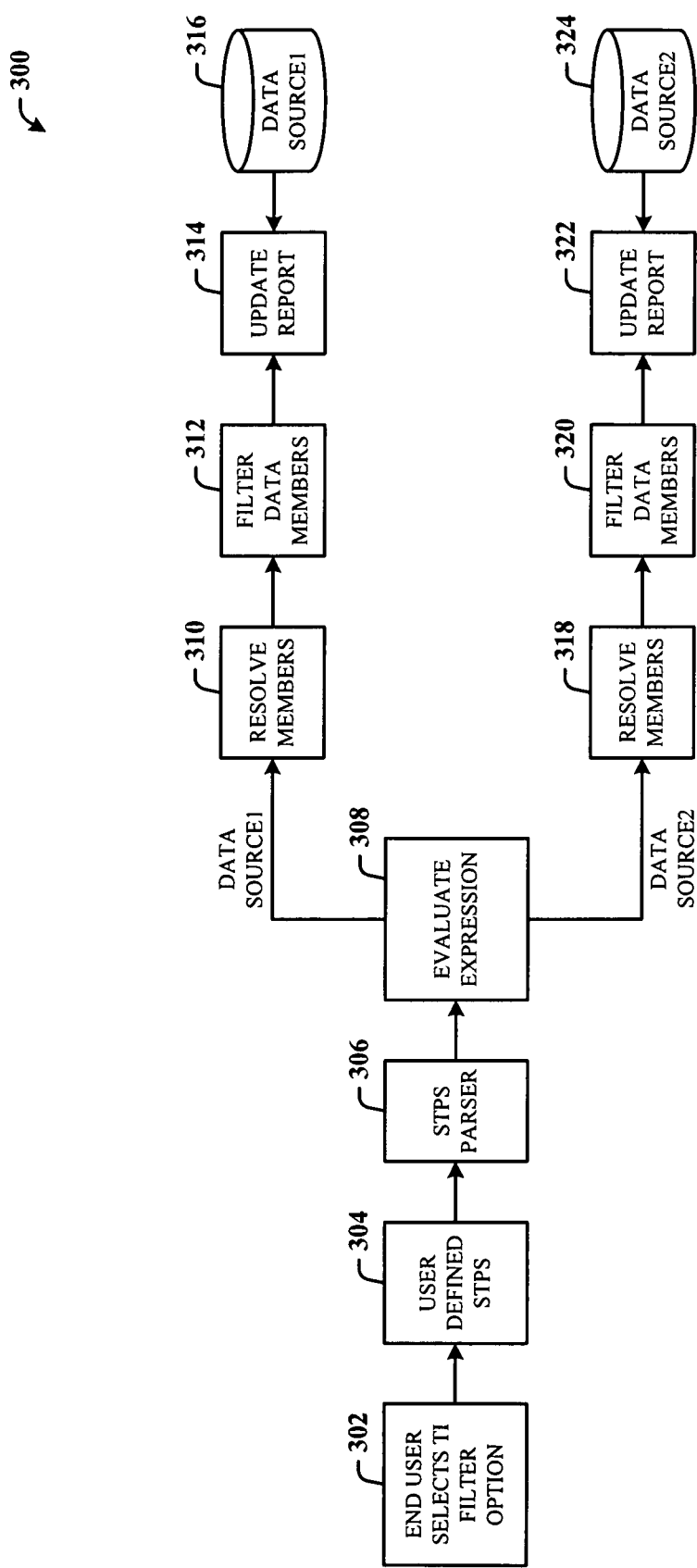
FIG. 3 illustrates an exemplary flow diagram for updating datasets.

FIG. 3 illustrates an exemplary flow diagram 300 for updating datasets. When STPS is evaluated in a TI filter, the syntax is parsed and resolved to an expression appropriate to the data source. For example, consider a case where the user wants to use data from a SQL (structured query language) table, and two different analysis services cubes for the reports the user wants to add to a dashboard. When the STPS syntax is evaluated for the TI filter, the SQL syntax is resolved by natively applying logic to the dimension created on the table. A separate member expression is created for each cube as well. In all cases, the member expressions are created relative to the current date.

When deployed to document collaboration server and linked to a set of reports, a single filter can process the reports (datasets) simultaneously regardless from which data source the reports are derived. In this example, a single filter can modify two reports, where the reports are based on a combination of tabular and multidimensional data sources.

At 302, the user selects a TI filter option. At 304, the user interacts with the filter setting using the STPS language. At 306, a parser parses the STPS syntax. At 308, an expression generated from the parser is evaluated against a dataset of a first data source. At 310, dataset members are resolved. At 312, the data members are filtered. At 314, the corresponding report is updated based on the first data source 316. At 308, the expression generated from the parser is evaluated against a dataset of a second data source. At 318, dataset members are resolved. At 320, the data members are filtered. At 322, the corresponding report is updated based on the second data source 324.

Following are scenarios that exemplify the flexibility that can be obtained in accordance with the architecture.

A user can create a report that shows the status of the current period in comparison to the same period the year before. This provides insight into performance year-over-year. Combined with a comparison to the previous period, the configuration provides insight into overall performance against a historical backdrop. To reduce the amount of time spent updating these documents, the user can configure these periods to automatically update with the most current information.

The user can also provide the previous n . . . periods+current period to date, for example, the user wants to display the last six periods on a plant operations scorecard and includes the current period.

The user can also provide the previous n . . . periods, current period, forecast n . . . periods. The user desires to use data from a data cube on a scorecard for historical content. Data from a spreadsheet can also be used for forecasting the next three months worth of sales. Historical data can be derived from transactional data that has been compiled into a cube. Forecasting data is based on predictive models maintained in the spreadsheets. Since the models vary and change often, it is not feasible to integrate the business logic into the cubes.

In another scenario, the user can obtain filtered prior months in a year, current month-to-date, and year-to-date. In this case, the user wants to create a scorecard that shows overall performance for the year-to-date. In addition, the scorecard shows performance for each month completed for the year. The current month can be called out separately and uses different indicators to represent progress towards the monthly goals. Months that have not occurred will not be shown.

To facilitate the effective use of current existing enterprise data, the user can define time properties for all relevant data sources. This eliminates the need to define time everywhere or to incorporate data into OLAP data sources where, given the nature of the data, it may not be appropriate or desirable to do so.

The user can also define a time parameter for a dashboard using a unified time dimension. The user wants to filter a scorecard by year, quarter, and month. Dashboard reports, scorecards, and analytic views all use data from different data sources; however, the user only wants to add one time parameter to the dashboard.

The unified time dimension is a dimension that can be defined on any data source having a time or calendar dimension. Dimensionality is either mapped or created at the data source level to a common set of calendar and time aggregations. These aggregations are dynamic and defined against the current time. The user can specify a lag or lead value for current time to view either predictive or historical data. Using this dimension allows the user to create time that is a known number of units from the present date or time. Unlike TI functionality, the unified time dimension functionality can be used in conjunction with any tabular or multidimensional data source, and also allows these data sources to interact with one another and share filter and slice behavior. A Gregorian calendar is one example of a calendar that can serve as the basis of all time intelligence.

Using the ad-hock dimensions on tabular data, the user can aggregate these date values to the desired degree of granularity. The behavior is similar to group-by clauses applied to the tabular data column containing the time or calendar data. Any of the following aggregation levels can be used.

| Aggregation level: | Details: |
| --- | --- |
| Year | Any time period equaling a Gregorian calendar year. |
| Semester | Any six-month period bisecting a year. |
| Trimester | Any four month period trisecting a year. Trimesters are exclusive of Semesters and Quarters. |
| Quarter | A three-month period that bisects a semester or that divides a year into four periods. |
| Month | One of the Gregorian calendar months. |
| Week of year | A seven day period within a year, numbered. |
| Day | A standard 24 hour day. (Taking into account daylight savings time.) |
| Hour | A standard hour. This can be represented as 12 or 24 hour clock periods. |
| Minute | A standard minute. |
| Second | A standard second. |
| Fiscal Week number | Numeric week number used in financial reporting |
| Week number of year | |

To enable interaction between different data sources for time intelligence, time is defined within the context of each data source. The user can specify levels of time granularity and aggregation, when periods begin and end where appropriate, and how these elements interact with time information defined from other data sources. This feature allows time intelligence to be applied consistently to data from any compatible data source.

Two basic categories of time definition are employed and represent a fork in the user workflow: one for tabular data and one for multidimensional data. This is primarily due to the divergent nature of tasks surrounding these different categories of data.

Time in tabular data sources are defined as some variant of a date-time data type. The individual data source drivers are generally responsible for formatting this information in a compatible manner. Any field value that can be converted or cast as a .Net date-time data type can be used.

Multidimensional data sources utilize a different approach than that of tabular data sources. Since in most cases, time is defined in a cube already and at pre-existing levels of aggregation, the tasks related to time intelligence for multidimensional data sources relate to identifying and mapping this data to a known calendar.

The time intelligence feature maps time to a common calendar with common properties and levels of aggregation. Once this mapping is defined for a data source, data from that source can be aligned with and used in conjunction with other disparate data sources. When mapped data sources are used to create scorecards, reports and analytic views or parameters, time values will be automatically aligned.

With respect to mathematical properties of unified time dimensions, let A(m) be the set of cube members and U(t) be the set of unified time units (given that A and U both represent sets comprised of identical level time units), c is the count of members at the same aggregation level from reference member one to current, and n is a signed integer index value assigned to time units starting from current as zero that increase in either direction.

$$A(m)\{m_1,m_2,m_3,\ldots,m_c\}; U(t)\{t_n,\ldots,t_2,t_1,t_0\}$$

$$\textit{iff } n=c-1, \Rightarrow A(m) \cong U(t)$$

This implies that A(m) and U(t) are equivalent in both cardinality and ordinality (hence, the congruency operator above).

This means that valid operations that can be performed on A can also be performed on U. Congruency between A(m) and U(t) sets is a prerequisite and sufficiency test for interoperability between data source time dimensions. If in the case A≠U, then A is assumed to have irregular intervals. The user can work around this anomaly by setting reference dates to occur after such anomalies.

$$A(m)\{m_1,m_2,m_3,\ldots,m_c\}; U(t)\{t_n,\ldots,t_2,t_1,t_0\}$$

Note also that in the case above, moving from left to right implies moving forward in time.

Since A type sets (multidimensional sets) originate from the reference date, the first period starts at the beginning of the set. Moving from $m_1$ to $m_6$ implies moving forward in time.

Since U type sets (tabular sets) start at present, the index values are reversed, and start at the end of the set. Therefore, moving from $t_5$ to $t_2$ also implies moving forward in time. Therefore, the following identities exist.

$$m_n = t_0 = \text{Current}$$

$$m_x = t_{n-x} \text{ or } m_{c-(x-1)} = t_x$$

Since time intelligence is calculated against current, U(t) will be the default set function. The benefit of this is that $t_0$ in U is equivalent to current. Time periods in the past therefore can be represented by negative values, and time periods in the future are positive. This is much more intuitive to the user. By default then, $m_x$ will most likely be represented by the identity $m_x = t_{n-x}$.

Note also that the index of set U(t) is zero based. Functionally of this correlates most accurately to the real timeline this framework operates in (i.e., $t_0$ is equal to the present moment or some offset from the present moment) where current is neither negative nor positive.

Abstracting this further, time periods can be represented by the numeric index value in the U(t) set. Syntactically, this is represented in the form of Period±n (e.g., t−5, or t+12) where t is some level of time aggregation and n is a numeric offset from this period.

Note that t in the equations above represents a standard time unit such as month, day, or week. The top-level unit is a year. With this in mind, time units will have different degrees of granularity and relationships to one another. Not all time periods are compatible with one another. TI therefore assumes that for purposes of calculating positions and offsets using the formula above, the unit represented by t between associated time period sets are the same.

This principle also allows for inconsistencies in duration that are inherent in some time periods such as month to be avoided. There is no need to compensate for variances in the number of days within a month. This implies that only periods that are even multiples or divisors of one another can be converted from to each other, for example, quarter and month.

To enable the use of a single time parameter on a dashboard, the user can use one or more data sources. Alignment between values can be handled through implicit mapping in most cases, although explicit mapping can be used if needed. Enumerations will be drawn from the principal data source for the parameter. Thus, for example, if the user is using an Analysis Services data source, enumerations would be the member captions. For tabular data sources, this would be the unified time dimension name.

Figure 4:
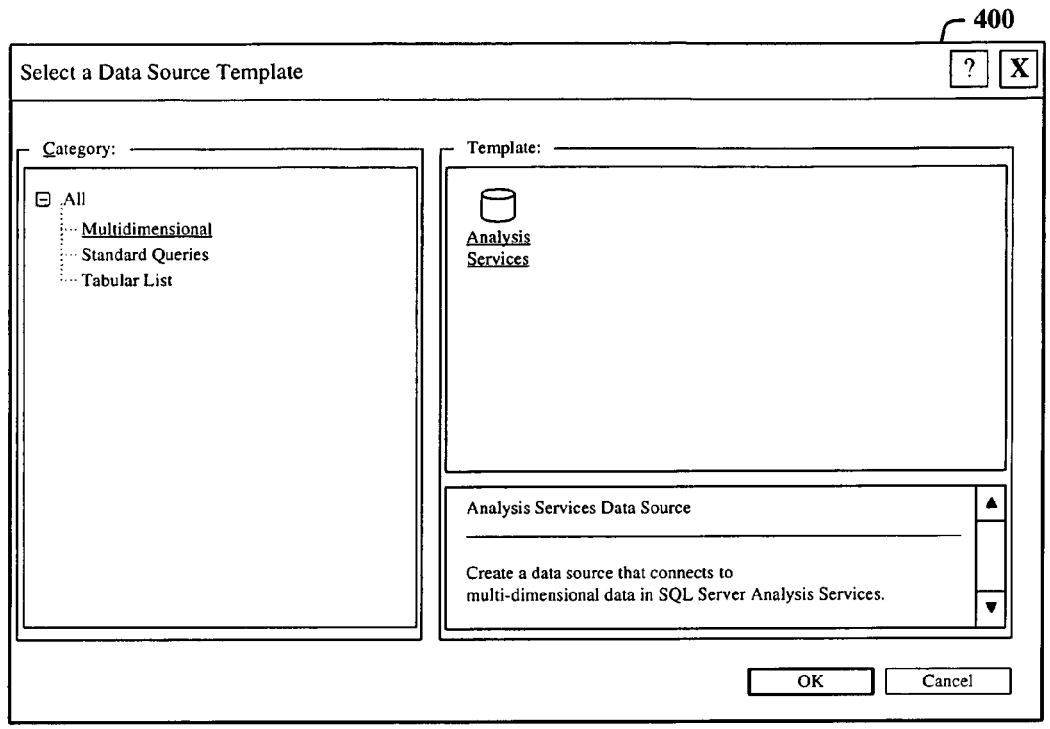
FIG. 4 illustrates an exemplary UI template for selecting an OLAP data source.
Figure 5:
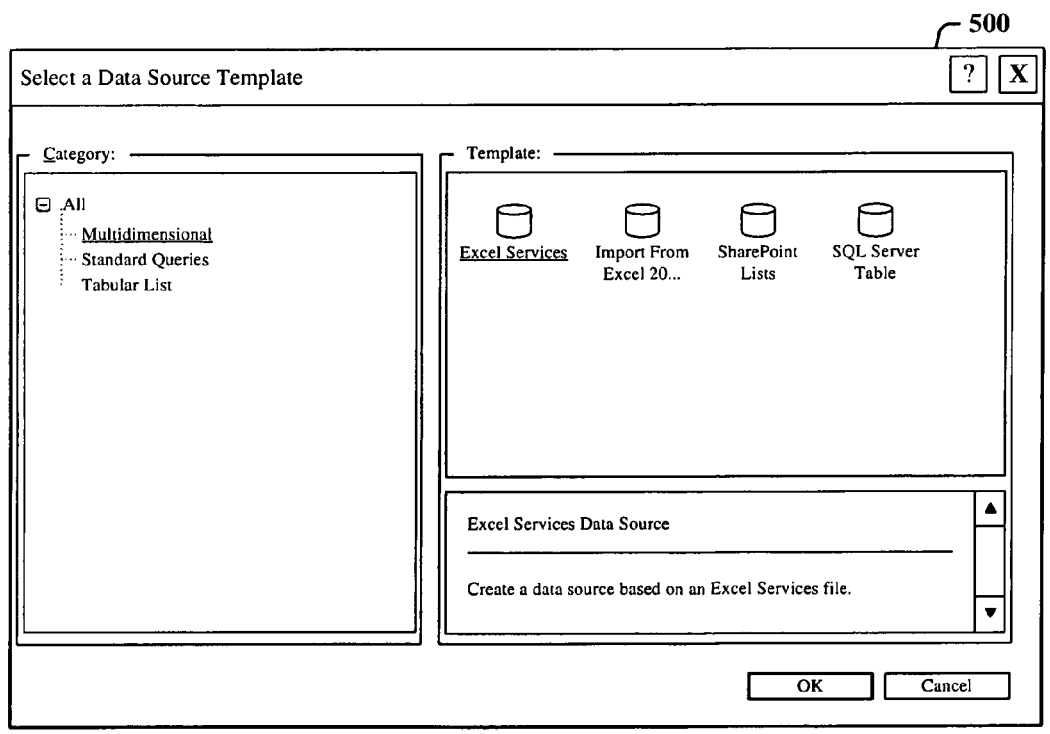
FIG. 5 illustrates the exemplary UI template for selecting a tabular list data source.
Figure 7:
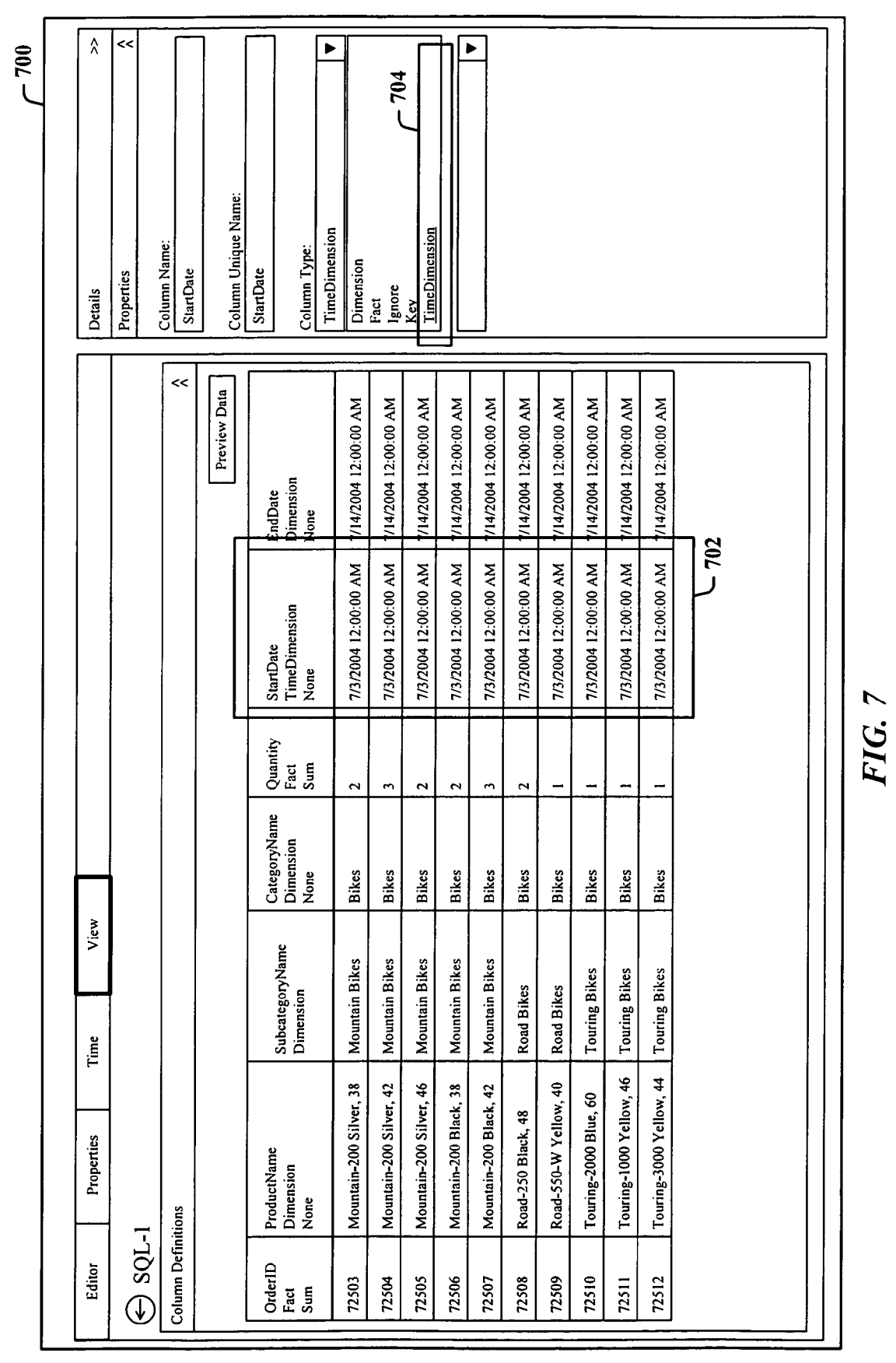
Figure 8:
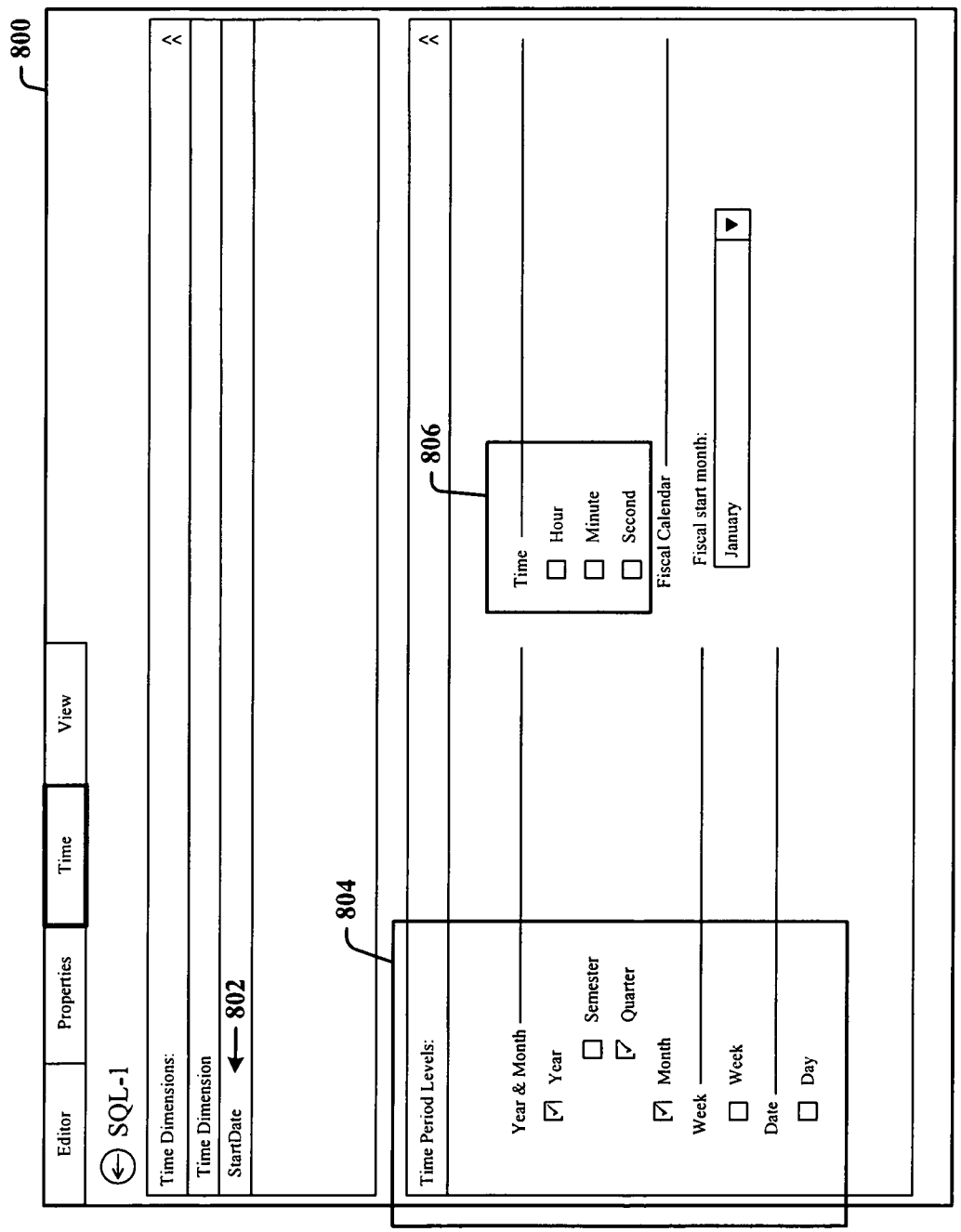
FIG. 8 illustrates a time configuration UI.

FIG. 4 illustrates an exemplary UI template 400 for selecting an OLAP data source. FIG. 5 illustrates the exemplary UI template 400 for selecting a tabular list data source. The tabular list data sources can include spreadsheet sources, document management platform (e.g., SharePoint by Microsoft Corporation), and a SQL server table, for example. FIG. 6 illustrates an exemplary dimension mapping UI 600. The mapping UI 600 allows selection of a reference member 602, reference date 604, member level 606, and time aggregation 608. FIG. 7 illustrates a data definition view 700 for tabular data. A date/time column 702 is provided as a time dimension 704. FIG. 8 illustrates a time configuration UI 800. A user can select a start date 802 and time period levels 804 and time details 806, for example.

Figure 9:
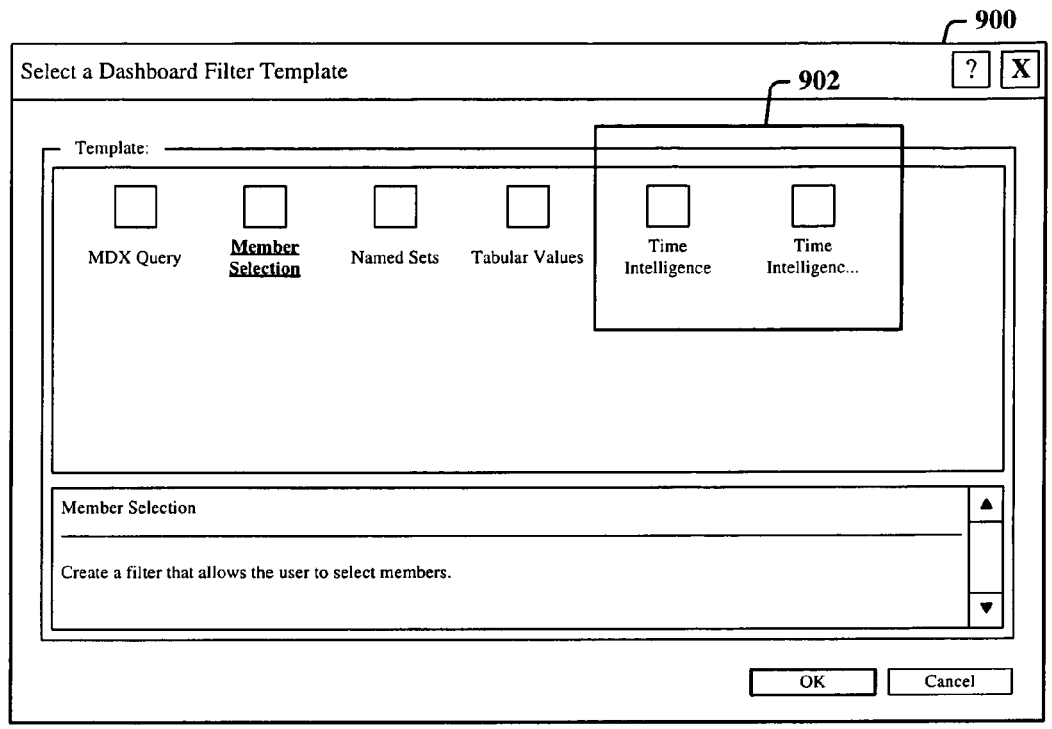
FIG. 9 illustrates a filter UI for selecting time intelligence.
Figure 10:
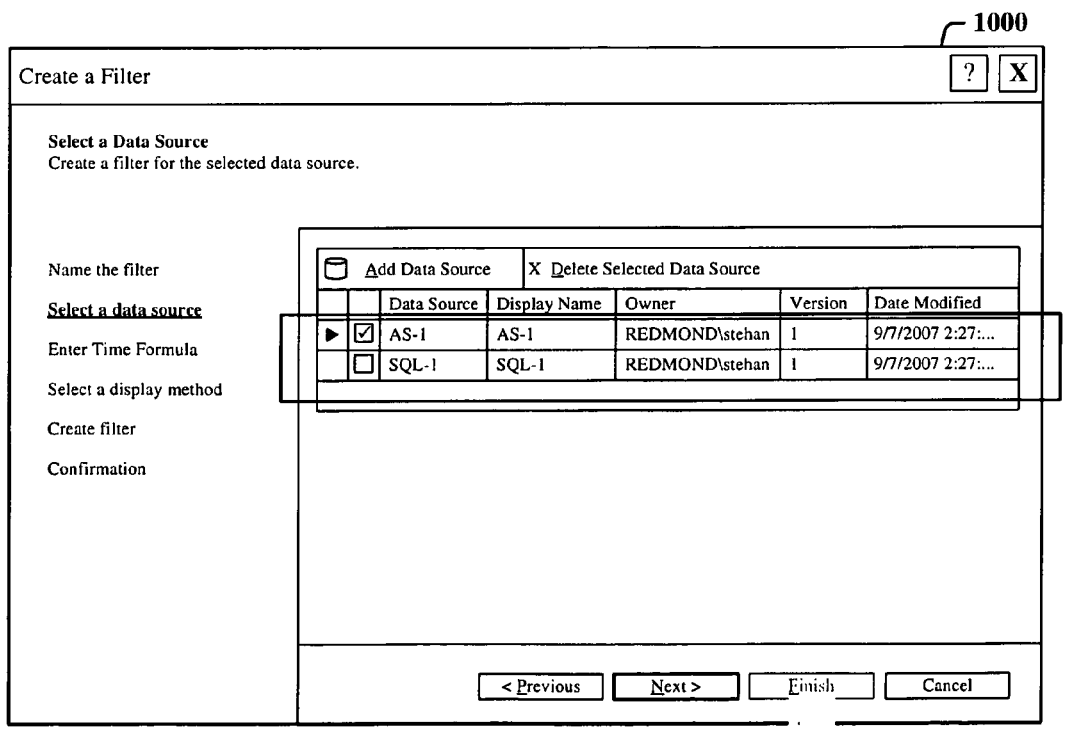
FIG. 10 illustrates a filter UI for selecting a data source.

FIG. 9 illustrates a filter UI 900 for selecting time intelligence, as indicated by a block 902 around two time intelligence selections. Once the time dimensionality for each data source is mapped to a common calendar, or created in the case of tabular data, there is sufficient information to slice the reports based on these data sources simultaneously using the same TI filter. The desired TI enabled data source can then be selected for use with the filter. One or more data sources can be specified. FIG. 10 illustrates a filter UI 1000 for selecting a data source. Note that both a SQL tabular source and an OLAP data source are selected. Both data sources can be used in the same filter.

Figure 11:
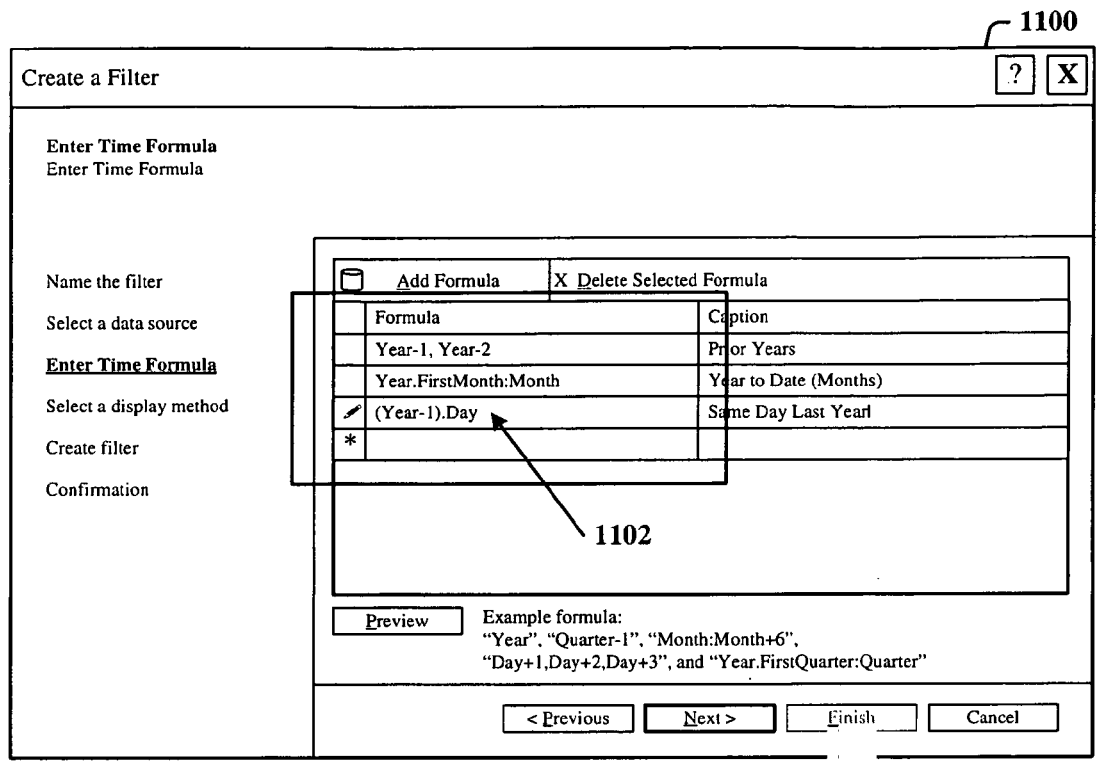
FIG. 11 illustrates a filter UI for entering time formulas.
Figure 12:
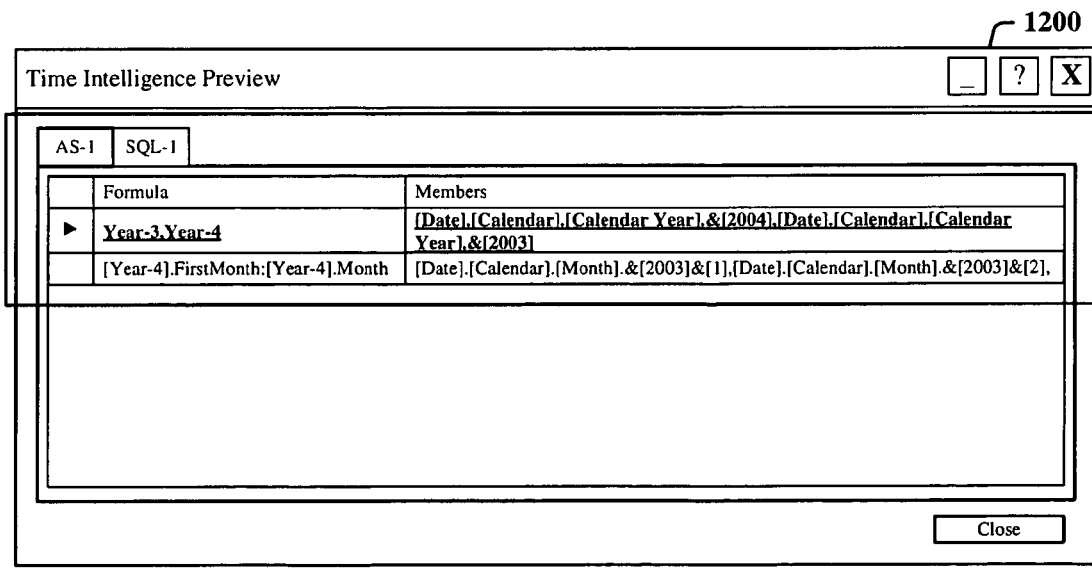
FIG. 12 illustrates a TI preview UI that shows a formula that resolves to members of the selected data source.

FIG. 11 illustrates a filter UI 1100 for entering time formulas. When creating and configuring a TI filter, the user can enter STPS syntax 1102 to specify offsets from the current date, time periods, parallel periods, and sets or ranges of time periods (e.g., Year-1 or Month:Month-6 or (Year-1).firstmonth, etc.). FIG. 12 illustrates a TI preview UI 1200 that shows a formula that resolves to members of the selected data source. FIG. 13 illustrates a UI 1300 that shows a time slice for two scorecards 1302 and 1304. Here, a calendar control 1306 is used to slice time for the two scorecards (1302 and 1304). Note that differing degrees of granularity can be employed for time periods. The data sources in this case are different for each scorecard.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 14:
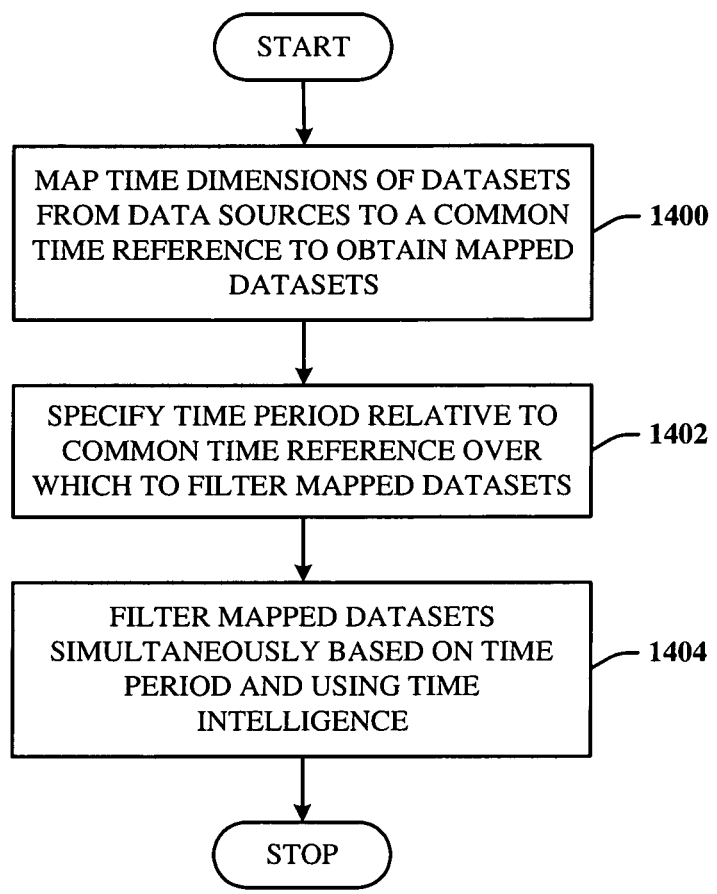
FIG. 14 illustrates a computer-implemented method of processing data.

FIG. 14 illustrates a computer-implemented method of processing data. At 1400, time dimensions of datasets are mapped from data sources to a common time reference to obtain mapped datasets. At 1402, the mapped datasets are filtered simultaneously based on a time period and using time intelligence. At 1404, the time period relative to the common time reference is specified over which to filter the mapped datasets.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 15:
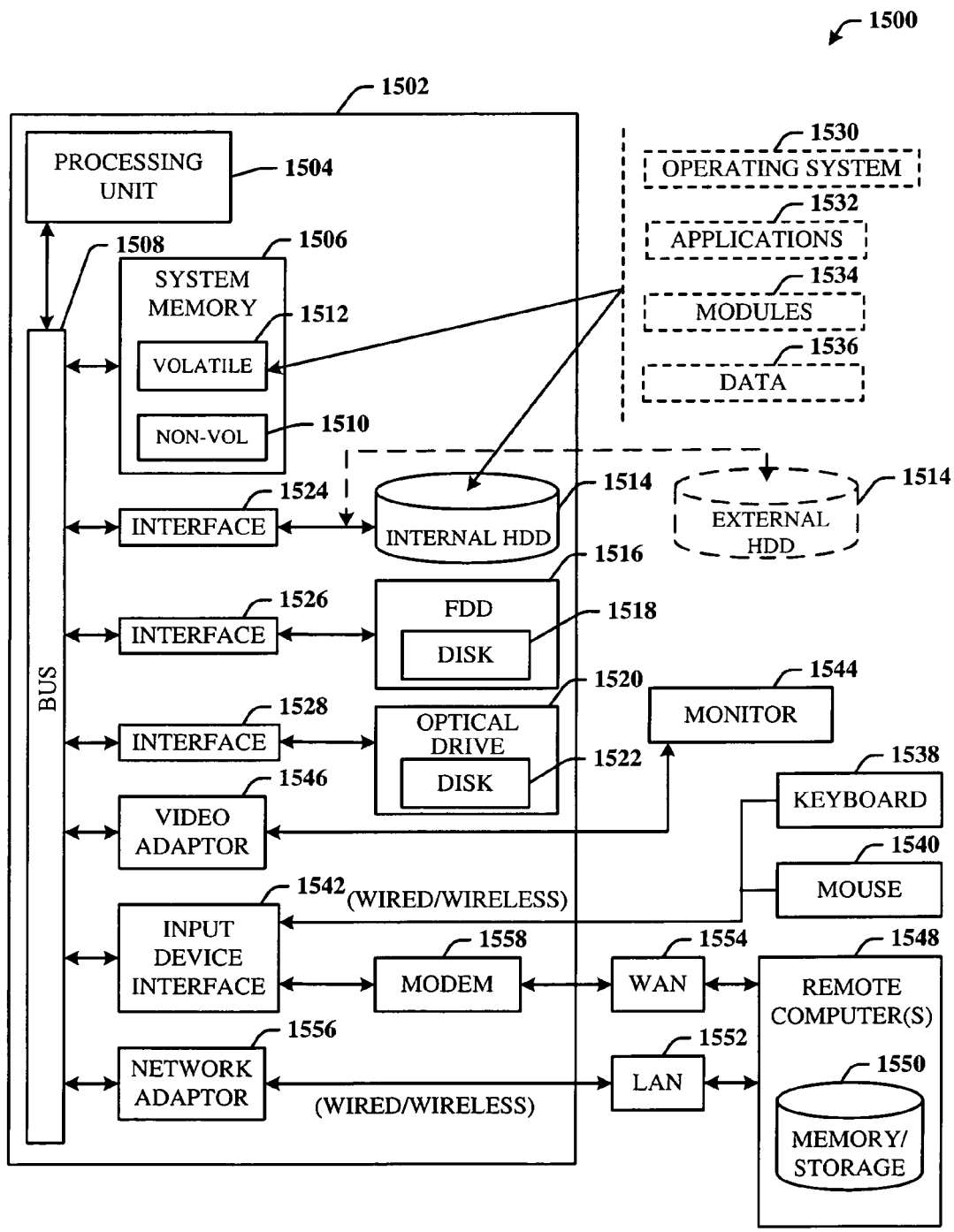
FIG. 15 illustrates a block diagram of a computing system operable to execute navigation across datasets from multiple data sources based in a common reference dimension in accordance with the disclosed architecture.

Referring now to FIG. 15, there is illustrated a block diagram of a computing system 1500 operable to execute navigation across datasets from multiple data sources based in a common reference dimension in accordance with the disclosed architecture. In order to provide additional context for various aspects thereof, FIG. 15 and the following discussion are intended to provide a brief, general description of a suitable computing system 1500 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary computing system 1500 for implementing various aspects includes a computer 1502 having a processing unit 1504, a system memory 1506 and a system bus 1508. The system bus 1508 provides an interface for system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 can include non-volatile memory (NON-VOL) 1510 and/or volatile memory 1512 (e.g., random access memory (RAM)). A basic input/output system (BIOS) can be stored in the non-volatile memory 1510 (e.g., ROM, EPROM, EEPROM, etc.), which BIOS are the basic routines that help to transfer information between elements within the computer 1502, such as during start-up. The volatile memory 1512 can also include a high-speed RAM such as static RAM for caching data.

The computer 1502 further includes an internal hard disk drive (HDD) 1514 (e.g., EIDE, SATA), which internal HDD 1514 may also be configured for external use in a suitable chassis, a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as a DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1512, including an operating system 1530, one or more application programs 1532, other program modules 1534, and program data 1536. The one or more application programs 1532, other program modules 1534, and program data 1536 can include the mapping component 102, data sources 104, dimension reference(s) 106, filter component 108, language component 202, UI component 204, functionality associated with flow diagram 300, and the UIs (400, 500, 600, 700, 800, 900, 1000, 1100, 1200, 1300), for example.

All or portions of the operating system, applications, modules, and/or data can also be cached in the volatile memory 1512. It is to be appreciated that the disclosed architecture can be implemented with various commercially available operating systems or combinations of operating systems.

A user can enter commands and information into the computer 1502 through one or more wire/wireless input devices, for example, a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, etc.

A monitor 1544 or other type of display device is also connected to the system bus 1508 via an interface, such as a video adaptor 1546. In addition to the monitor 1544, a computer typically includes other peripheral output devices (not shown), such as speakers, printers, etc.

The computer 1502 may operate in a networked environment using logical connections via wire and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, is connected to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 16:
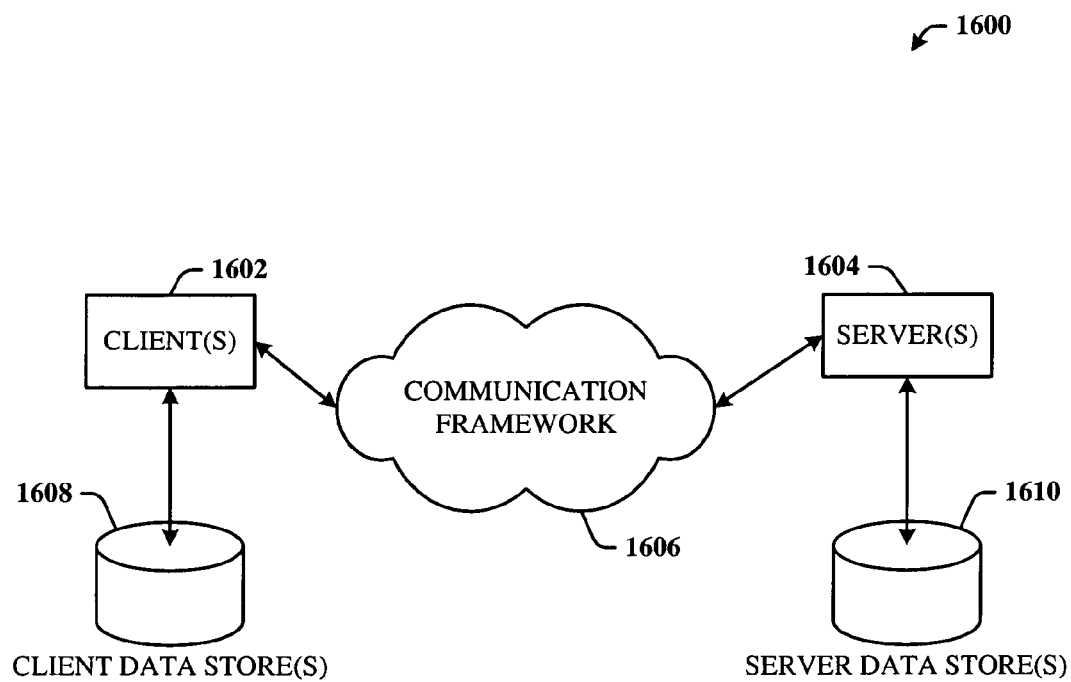
FIG. 16 illustrates a schematic block diagram of an exemplary computing environment that supports simultaneous slicing across datasets from OLAP and tabular data sources.

Referring now to FIG. 16, there is illustrated a schematic block diagram of an exemplary computing environment 1600 that supports simultaneous slicing across datasets from OLAP and tabular data sources. The environment 1600 includes one or more client(s) 1602. The client(s) 1602 can be hardware and/or software (e.g., threads, processes, computing devices). The client(s) 1602 can house cookie(s) and/or associated contextual information, for example.

The environment 1600 also includes one or more server(s) 1604. The server(s) 1604 can also be hardware and/or software (e.g., threads, processes, computing devices). The servers 1604 can house threads to perform transformations by employing the architecture, for example. One possible communication between a client 1602 and a server 1604 can be in the form of a data packet adapted to be transmitted between two or more computer processes. The data packet may include a cookie and/or associated contextual information, for example. The environment 1600 includes a communication framework 1606 (e.g., a global communication network such as the Internet) that can be employed to facilitate communications between the client(s) 1602 and the server(s) 1604.

Communications can be facilitated via a wire (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
    a mapping component configured to map existing time dimensions of multidimensional datasets from multiple different data sources having different time stamps to align the data sources with a common dimension reference of a common calendar with common properties and common levels of dynamic time aggregation defined against a current time to obtain mapped datasets, to compute absolute positions of the time stamps;
    a filter component configured to filter the mapped datasets simultaneously based in part on offsets to the common calendar and levels of dynamic time aggregation, to enable viewing of portions of the datasets based on any time period implemented; and
    a processor that executes computer-executable instructions associated with at least one of the mapping component or the filter component.

2. The system of claim 1, wherein the datasets are at least one of reports or scorecards presented as part of a dashboard.

3. The system of claim 1, wherein the data sources include tabular data and OLAP (online analytical processing) data.

4. The system of claim 1, wherein the datasets are mapped to a common time dimension reference.

5. A computer-implemented system, comprising:
    a mapping component configured to map existing time dimensions of datasets from multiple different data sources having different time stamps to align the data sources with a common time reference of a common calendar with common properties and common levels of dynamic time aggregation defined against a current time to obtain mapped datasets, to compute absolute positions of the time stamps;
    a language component configured to specify a time period relative to the common calendar and levels of dynamic time aggregation over which to filter the mapped datasets;
    a filter component configured to filter the mapped datasets simultaneously based on the time period, to enable viewing of portions of the datasets based on any time period implemented; and
    a processor that executes computer-executable instructions associated with at least one of the mapping component, the language component, or the filter component.

6. The system of claim 5, wherein the mapped datasets are at least one of reports or scorecards processed as part of a dashboard, the datasets obtained from data sources that include tabular data and multidimensional data.

7. The system of claim 5, wherein the language component facilitates specifying time dimensionality of a date-time column in the tabular data.

8. The system of claim 5, wherein the filter component employs time intelligence for filtering the mapped datasets over the time period relative to a current date based on a calendar as the common time reference.

9. The system of claim 5, wherein the filter component filters the mapped datasets based on at least one of the data sources.

10. The system of claim 5, wherein the language component facilitates specifying of an offset from a current date, time periods, parallel periods, and sets or ranges of time periods.

11. A computer-implemented method of processing data, comprising acts of:

mapping existing time dimensions of datasets from data sources multiple different data sources having different time stamps to align the data sources with a common time reference of a common calendar with common properties and common levels of dynamic time aggregation defined against a current time to obtain mapped datasets, to compute absolute positions of the time stamps;

filtering the mapped datasets simultaneously based on a time period and using time intelligence, to enable viewing of portions of the datasets based on any time period implemented; and utilizing a processor that executes instructions stored in memory to perform at least one of the acts of mapping or filtering.

12. The method of claim 11, further comprising specifying the time period relative to the common time reference over which to filter the mapped datasets.

13. The method of claim 11, further comprising extracting the datasets from both a multidimensional data source and a tabular data source.

14. The method of claim 11, further comprising mapping a single time member from the datasets to a reference date and configuring offsets from the reference date for multidimensional data.

15. The method of claim 11, further comprising defining time dimensionality on data-time columns in tabular data.

16. The method of claim 11, further comprising simultaneously slicing the datasets using a same time intelligence filter and choosing one or more data sources on which to base the filter.

17. The method of claim 11, further comprising inputting syntax to filter, parsing the syntax, resolving the syntax to an expression for the data sources relative to a current date.

* * * * *